United States Patent
Hils et al.

(10) Patent No.: US 6,320,340 B1
(45) Date of Patent: Nov. 20, 2001

(54) DRIVE DEVICE FOR ADJUSTING A DEVICE BETWEEN TERMINAL POSITIONS

(75) Inventors: Alois Hils, Sasbach; Friedrich-Wilhelm Dreier, Sinzheim; Christian Baeuerle, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,028

(22) PCT Filed: Oct. 26, 1999

(86) PCT No.: PCT/DE99/03406

§ 371 Date: Oct. 23, 2000

§ 102(e) Date: Oct. 23, 2000

(87) PCT Pub. No.: WO00/38299

PCT Pub. Date: Jun. 29, 2000

(30) Foreign Application Priority Data

Dec. 18, 1998 (DE) .............................. 198 58 630

(51) Int. Cl.[7] .................. H02P 1/04; B06J 7/057
(52) U.S. Cl. .................... 318/443; 318/444; 318/445; 318/DIG. 2
(58) Field of Search ................. 318/DIG. 2, 282–293, 318/443–466, 10, 280; 200/19 R; 15/250.17, 250.001; 49/502; 70/237; 340/384.1, 686.1, 691.7

(56) References Cited

U.S. PATENT DOCUMENTS

| | | | |
|---|---|---|---|
| 4,259,624 | * | 3/1981 | Seibicke . |
| 4,700,026 | * | 10/1987 | Kamiyama et al. . |
| 4,931,710 | * | 6/1990 | DeVara et al. . |
| 5,844,382 | * | 12/1998 | Dan . |
| 5,903,114 | * | 5/1999 | Miller et al. . |
| 5,917,298 | * | 6/1999 | Miller . |
| 5,920,158 | * | 7/1999 | Miller et al. . |
| 5,949,206 | * | 9/1999 | Oruganty et al. . |
| 6,002,323 | * | 12/1999 | Bomya . |
| 6,018,223 | * | 1/2000 | Oruganty et al. . |
| 6,111,378 | * | 8/2000 | LeMay et al. . |
| 6,163,125 | * | 12/2000 | Bernauer et al. . |
| 6,249,098 | * | 6/2001 | Miyazaki et al. . |

* cited by examiner

*Primary Examiner*—Paul Ip
(74) *Attorney, Agent, or Firm*—Ronald E. Greigg

(57) ABSTRACT

A drive device for a part of a vehicle that can be adjusted between terminal positions, in particular the roof panel of a vehicle roof, having an electric motor that is connected to a pinion via a first step-down gear. A switch device that controls the electric motor for stopping the electric motor in at least one predetermined position of the adjustable part, and a second step-down gear that moves a switch body. A magnetic-field-sensitive sensor, controllable by the switch body, for controlling the switch device. A conductor track board inside a housing and extending with an extension over the path of motion of the switch element. The magnetic-field-sensitive sensor is disposed at a radial distance from the circular path of motion of the switch body and bridges the distance between the magnetic-field-sensitive sensor and the path of motion of the switch body by means of magnetic flux guide bodies. The magnetic flux guide bodies can be produced inexpensively of soft magnetic wire so that the conductor track board can be made with straight boundary edges, oriented at right angles to one another, in order to avoid waste.

4 Claims, 2 Drawing Sheets

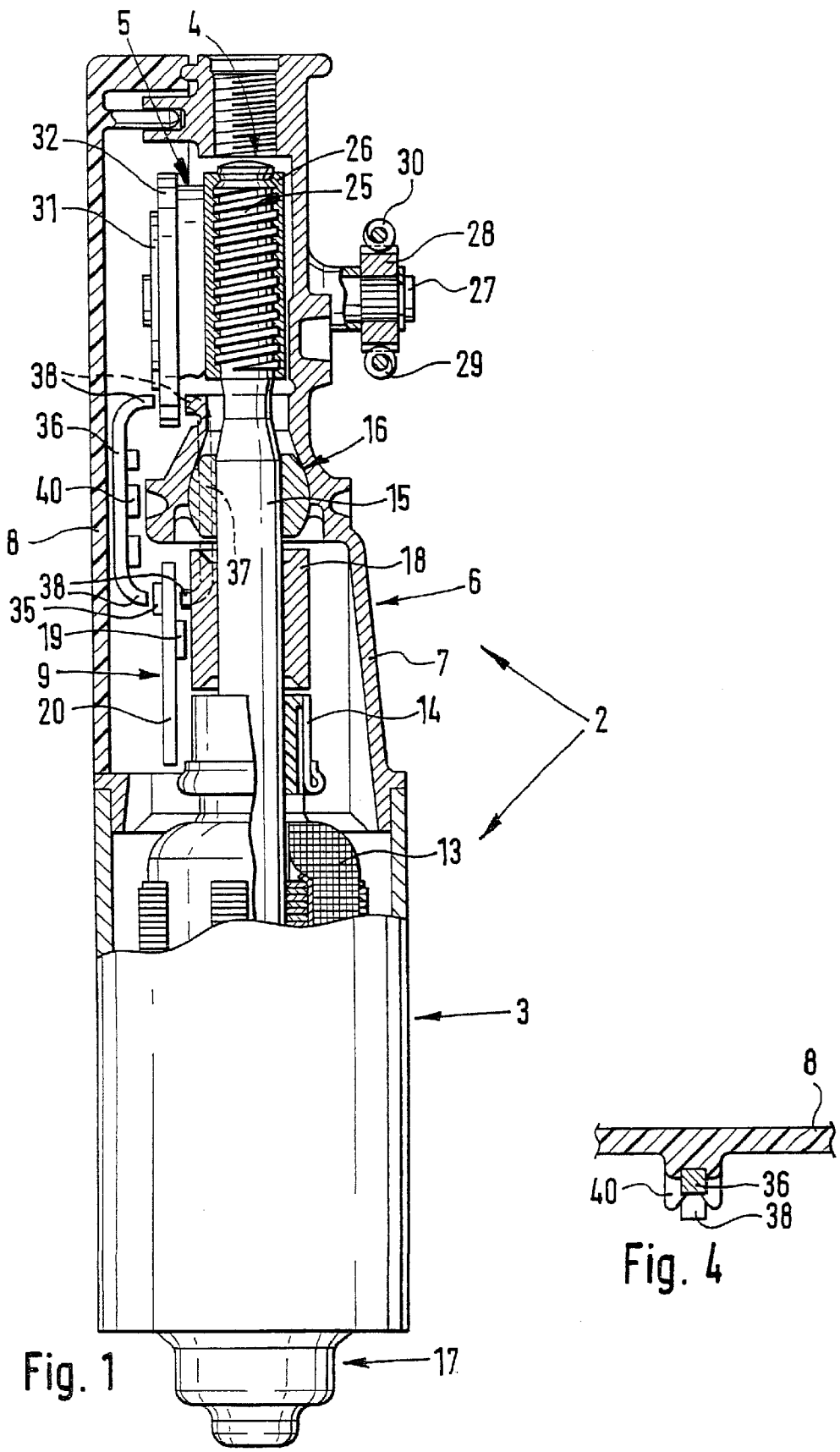

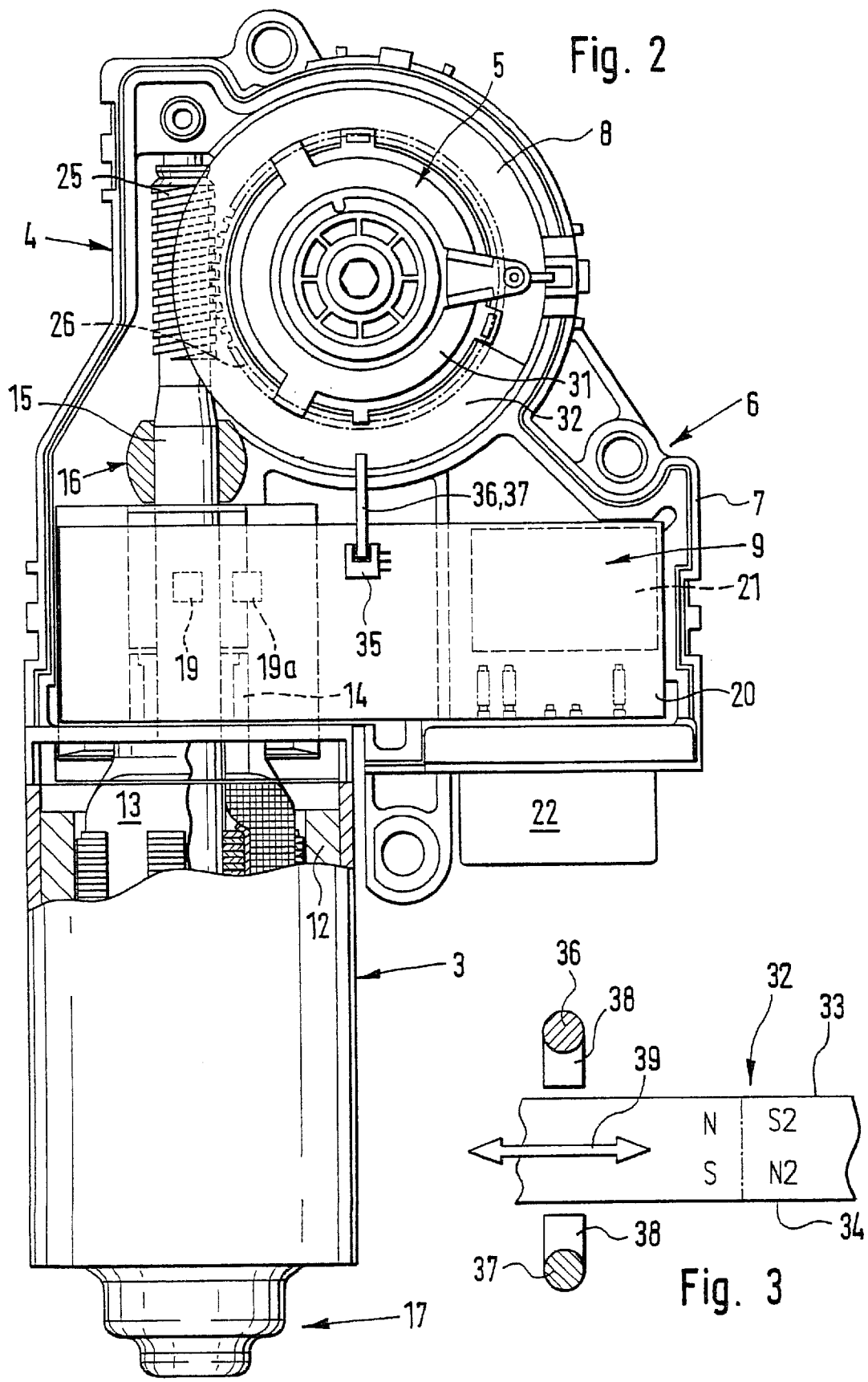

DRIVE DEVICE FOR ADJUSTING A DEVICE BETWEEN TERMINAL POSITIONS

PRIOR ART

The invention is based on a drive device for adjusting a device used in a vehicle between terminal positions.

From German Patent DE 197 12 185 C1, a drive device is known for a part of a vehicle that can be adjusted between terminal positions, especially for a roof panel of a vehicle roof, having an electric motor that is connected via a first step-down gear to a pinion seated on a shaft. The pinion is drivingly connected to the adjustable part. A switch device controls the electric motor, for stopping the electric motor in at least one predetermined position of the adjustable part. A second step-down gear has a rotatable power takeoff element, and a switch body, connected to the power takeoff element, for actuating the switch device, wherein the switch body has at least one north pole and one south pole. The switch device includes a magnetic-field-sensitive sensor that is disposed on a conductor track board of the switch device. To that end, the conductor track board extends to beyond the path of motion of the switch body. In viewing the drawings of DE 197 12 185 C1, the conductor track board, in the region of the magnetic-field-sensitive sensor, has an extension that protrudes for instance from an otherwise rectangular outline of the conductor track board. It can be appreciated that this extension makes for conductor track board waste and thus entails expenses for wasted material and expenses for disposing of the wasted material.

The second gear of this drive device is embodied in the manner of an eccentric gear-wheel system. The power takeoff element is embodied as a gear wheel with teeth on the inside that is supported such that the gear wheel can be rotated concentrically with the shaft of the first step-down gear. Instead of this kind of eccentric gear wheel system, a spur wheel gear with a power takeoff shaft or a worm gear in accordance with German Patent 1 024 373 can naturally be used. In the exemplary embodiment of the German patent, the worm wheel serves as the power takeoff element, and the switch body is embodied as a pin and is secured radially to the worm wheel. The pin actuates electrical contacts.

ADVANTAGES OF THE INVENTION

The drive device has an advantage that a rectangular outline, for instance, can be selected for the conductor track board. To produce this kind of rectangularly bounded conductor track board, all that has to be done, in a technologically simple way, is to cut a platelike starting material apart lengthwise and crosswise. In the production of the magnetic flux guide body, the starting material can be a rod material or a wire material, so that the only waste produced is at the end of rods or wire coils. Metal wire or rod material waste can be re-melted and thus re-used.

The definitive characteristics set forth herein have the advantage that the switch body can be magnetized in a technologically simple way, and furthermore, magnetic flux originating at the switch body can be concentrated readily on the magnetic-field-sensitive sensor.

BRIEF DESCRIPTION OF THE DRAWINGS

One exemplary embodiment of the drive device of the invention for an adjustable part of a vehicle is shown in the drawing and described in further detail below.

FIG. 1 shows the drive device in side view, partly cut away;

FIG. 2 is a plan view on the drive device of FIG. 1;

FIG. 3 shows an enlarged detail of FIGS. 1 and 2 in side view; and

FIG. 4 shows a detail of a part of FIG. 1.

DESCRIPTION OF THE EXEMPLARY EMBODIMENT

The drive device 2 of the invention, which is shown in FIGS. 1 and 2, has an electric motor 3, a first step-down gear 4, a second step-down gear 5, a housing 6 comprising a lower housing part 7 and an upper housing part 8, and a switch device 9 that controls the electric motor 3.

The electric motor 3 is for instance a direct current motor and has field magnets 12, and inside the field magnets 12 a rotatable armature, a collector 14 adjacent to the armature 13, an armature shaft 15 that supports the armature 13 and the collector 14, and a first motor shaft bearing 16 and a second motor shaft bearing 17. A hollow magnet body 18, for instance, of a type known per se, for instance with a north pole and a south pole distributed over its circumference, is disposed on the armature shaft 15, between the first motor shaft bearing 16 and the collector 14, in a manner secure against relative rotation. Along the circumference of the hollow magnet body 18, at least one magnetic-field-sensitive sensor 19, 19a, for instance a Hall sensor, is mounted in stationary fashion. For instance, the Hall sensors 19, 19a are supported by a conductor track board 20. This conductor track board 20 is a load-bearing component for the controlling switch device 9. The conductor track board 20 is for instance secured to the lower housing part 7 and is oriented such that with a minimum spacing, the conductor track board; intersects the collector 14 and the Hall sensor 19. This spacing can be seen clearly in FIG. 1. The fact that the conductor track board 20 intersects the collector 14 and the Hall sensor 19 can be seen clearly in FIG. 2. The conductor track board 20 has been given the form of a slender rectangle, so that out of the area in question, in which the collector 14 and the hollow magnet body are located, the conductor track board extends next to the electric motor 3, past the first step-down gear 4 and the second step-down gear 5. There, a relay arrangement 21 and a plug base 22, connected to the conductor track board 20, as well as other electrical elements, not shown, are for instance located. For instance, conductor tracks, not shown, lead from the relay arrangement 21 to brushes, not shown, that are resiliently pressed against the collector 14. The relay arrangement 21 is designed such that the motor can be turned on and off, rotating in different directions of rotation.

The upper housing part 8 is mounted on the lower housing part 7; the lower housing part 7 and the upper housing part 8 surround the conductor track board 20 protectively on all sides. To this extent, the control switch device 9 disposed on the conductor track board 20 is integrated with the drive device 2.

The armature shaft 15 is lengthened in the region of the first armature bearing 16 to form a worm shaft 25, which meshes with a worm wheel 26. The worm wheel 26 is connected in a manner fixed against relative rotation to a shaft 27 and is rotatably supported by means of this shaft 27 in the lower housing part 7. The worm wheel shaft 25, worm wheel 26 and shaft 27 form the first step-down gear 4. The shaft 27 is connected in a manner fixed against relative rotation to a pinion 28 disposed outside the housing part 7. The pinion 28 meshes with two tension and compression means 29, 30 of the flexible type, which by way of example are extended to a roof panel, not shown, of a vehicle roof and are connected to this roof panel. These tension and compression means 29, 30 are not a component of the invention; they can be found in the prior art. Merely for the sake of completeness is it pointed out that naturally instead of a roof panel, any other adjustable part, such as a window or vehicle door, can be driven.

In the exemplary embodiment, in a manner disclosed by German Patent DE 197 12 185 C1, the second step-down gear 5 is mechanically coupled to the shaft 27 of the first step-down gear 4. The second step-down gear 5 is embodied for instance in the manner of DE 197 12 185 C1, or in some other way that can be learned from the prior art. Within the scope of the present invention, the only critical aspect in this connection is that the second step-down gear 5 includes a rotatable power takeoff element 31 for supporting a switch body 32 and for moving this switch body 32 along a circular-arclike path. The step-down gear 5 is designed such that upon an adjustment, for instance of a roof panel, between two structurally defined terminal positions, the power takeoff element 31 undergo a rotation of less than 360°. For instance, an engineer can limit the rotatability to 300°.

In the exemplary embodiment, the switch body 32 is embodied in the manner of a closed circular-annular disk and has a first face end 33, defined with a circular-annular face, and a second face end 34, also defined by a circular-annular face. As shown enlarged in FIG. 3, the switch body 2 is magnetized in such a way that the switch body has a north pole N on one of its two face ends and a south pole S associated with the switch body on the other of the face ends. A south pole S2 can for instance be located next to the north pole N, offset from the north pole N circumferentially, and a north pole N2 on the opposite face end can be associated with the south pole S2 and can be located adjacent to the first south pole S mentioned.

The switch body 32 is used for remote actuation of a magnetic-field-sensitive sensor 35, which is secured to the conductor track board 20. As easily seen from FIGS. 1 and 2, a spacing between the magnetic-field-sensitive sensor 35 and the magnetized switch body 32 is multiple times greater than the housing dimensions of the magnetic-field-sensitive sensor 35. The magnetic-field-sensitive sensor 35 is a Hall sensor, for instance, and is oriented such that magnetic field lines extending substantially perpendicular to the conductor track board 20 lead to the generation and outputting of sensor signals.

Given the aforementioned great spacing from the switch body, in order for a magnetic field originating at the switch body to bring about a sufficiently strong flooding of the magnetic-field-sensitive sensor 35 whenever the switch body 32 assumes a switching position planned by the engineer, a first magnetic flux guide body 36 and a second magnetic flux guide body 37 are disposed between the magnetic-field-sensitive sensor 35 and the switch body 32, or the two face ends 33 and 34 of the latter. The magnetic flux guide bodies 36 and 37 for instance comprise wire segments of a soft magnetic material. Wire with a square cross section can for instance be used. For example, the magnetic flux guide bodies 36 and 37 have ends 38 bent at an angle, oriented on the one hand toward the magnetic-field-sensitive sensor 35 and on the other toward face ends 33, 34 of the switch body 32. As an example, such ends 38 can contact the magnetic-field-sensitive sensor 35 and the underside of the conductor track board 20, to avoid disadvantageously long air gap distances. Suitably, except for a minimum amount that tolerable from an engineering standpoint, the other ends 38, are extended as far as the face ends 36 and 37 of the switch body 32. In FIG. 1, supporting and securing means for the first magnetic flux guide body 36 are shown in suggested fashion; for instance, they are embodied in the form of claws 40 shown in suggested fashion in FIG. 4. The engineer is also free to embed the magnetic flux guide bodies 36 and 37 in thermoplastic fastening means, for instance, for the sake of alignment and positional securing relative to the stationary magnetic-field-sensitive sensor 35 and to the switch body 32, which is to be moved along a circular-arclike path between the two magnetic flux guide bodies 36 and 37.

The possible directions of motion relative to the ends 38 and thus to the magnetic flux guide bodies 36 and 37 is represented in FIG. 3 by a double arrow 39. This shows that inward motion of a pair of a poles, for instance comprising one north pole N and one south pole S, between the ends 38 leads to a magnetic flux through the magnetic-field-sensitive sensor 35, which is disposed at the aforementioned great spacing from the switch body 32. Depending on the magnetization of the switch body 32, at least a change in the aforementioned magnetic flux with respect to its intensity must be expected. A change in intensity also causes a signal change that is available to the controlling switch device 9. If two magnetic fluxes, as represented in FIG. 3 by a second south pole S2 and a second north pole N2, by motion of the switch body 32 in the directions indicated by the double arrow 39, successively penetrate the magnetic flux guide bodies 35, 36 and the magnetic-field-sensitive sensor 35 in different directions in succession, then the magnetic-field-sensitive sensor 35 is even capable of furnishing a signal with a change of polarity to the controlling switch device 9.

It should also be pointed out as a supplement that it suffices for the switch body 32 to be designed as magnetizable over only a part of its circumference. In this respect, the possibility exists of disposing a rodlike permanent magnet, not shown, in parallel alignment with the shaft 27 on a power takeoff element 31 that is adapted to the permanent magnet.

It will thus be appreciated that there are various possible ways of applying the described principle, that is of "a magnetic-field-sensitive sensor 35 at a great spacing from a magnetized switch body 32 and the disposition of magnetic flux guide bodies 36, 37", to an actual structural embodiment.

The foregoing relates to a preferred exemplary embodiment of the invention, it being understood that other variants and embodiments thereof are possible within the spirit and scope of the invention, the latter being defined by the appended claims.

What is claimed is:

1. A drive device (2) for adjusting a part of a vehicle between two terminal positions, comprising an electric motor (3) that is in driving communication with an adjustable part, a control switch device (9) that controls the electric motor (3) for stopping the electric motor (3) in at least one predetermined position of the adjustable part, a power takeoff element (31) that is rotatable at least indirectly by the electric motor (3), a switch body (32) that is secured to the power takeoff element (31) and is movable by the power takeoff element (31) along a circular-arclike path, a magnetic-field-sensitive sensor (35), associated with the controlling switch device (9), for controlling the control switch device (9), in which the magnetic-field-sensitive sensor (35) is disposed on a conductor track board (20) along with components of the controlling switch device (9), the conductor track board (20) is disposed inside a housing (6; 7, 8), and is disposed with radial spacing from a circular-arclike path of motion of the switch body (32), and the radial spacing is greater than the dimensions of the magnetic-field-sensitive sensor (35), and at least one magnetic flux guide body (36, 37) is disposed between the magnetic-field-sensitive sensor (35) and the switch body (32), when the switch body is in a switching position.

2. The drive device of claim 1, in which the switch body (32) is embodied substantially as a magnetized annular disk disposed concentrically to the drive element (31), with a first face end (33) and a second face end (34), one of the face ends has at least one north pole N, while an opposite face end has an associated south pole S, and that the at least one magnetic flux guide bodies (36, 37) are disposed identically in axial alignment with the first and second face ends (33, 34).

3. The drive device of claim 1, in which at least one additional magnetic-field-sensitive sensor is disposed on the conductor track board (20) at a spacing from the switch body (32), and that at least one additional magnetic flux guide body (36, 37) is associated with the additional sensor (35).

4. The drive device of claim 2, in which at least one additional magnetic-field-sensitive sensor is disposed on the conductor track board (20) at a spacing from the switch body (32), and that at least one additional magnetic flux guide body (36, 37) is associated with the additional sensor (35).

* * * * *